Dec. 24, 1968   K. PAAPE   3,417,936

DRIVE ARRANGEMENT FOR A TAPE RECORDER

Filed Nov. 28, 1966

Inventor:
Klaus Paape
by Michael S. Striker
Atty

United States Patent Office 3,417,936
Patented Dec. 24, 1968

3,417,936
DRIVE ARRANGEMENT FOR A TAPE RECORDER
Klaus Paape, Berlin, Germany, assignor to Robert Bosch Elektronik und Photokino G.m.b.H., Berlin-Wilmersdorf, Germany
Filed Nov. 28, 1966, Ser. No. 597,430
Claims priority, application Germany, Nov. 30, 1965, B 84,771
8 Claims. (Cl. 242—55.12)

ABSTRACT OF THE DISCLOSURE

A drive arrangement for a tape recorder including a wind-off disk, a take-up disk, and a capstan shaft with flywheel and drive pulley, in which a first friction wheel with a coaxial pulley is movable between an active position engaging the take-up disk for driving the same during normal operation of the recorder and an inactive position, and a second friction disk with a coaxial pulley is movable between a pair of end positions respectively engaging the take-up disk or the wind-off disk for respectively driving the same, in which a slip clutch is located between the first friction disk and its coaxial pulley, whereas the other pulleys are fixed to the respective wheels for synchronous rotation therewith, and in which the three pulleys are driven by an endless rubber cord from a motor.

---

Figure 1:
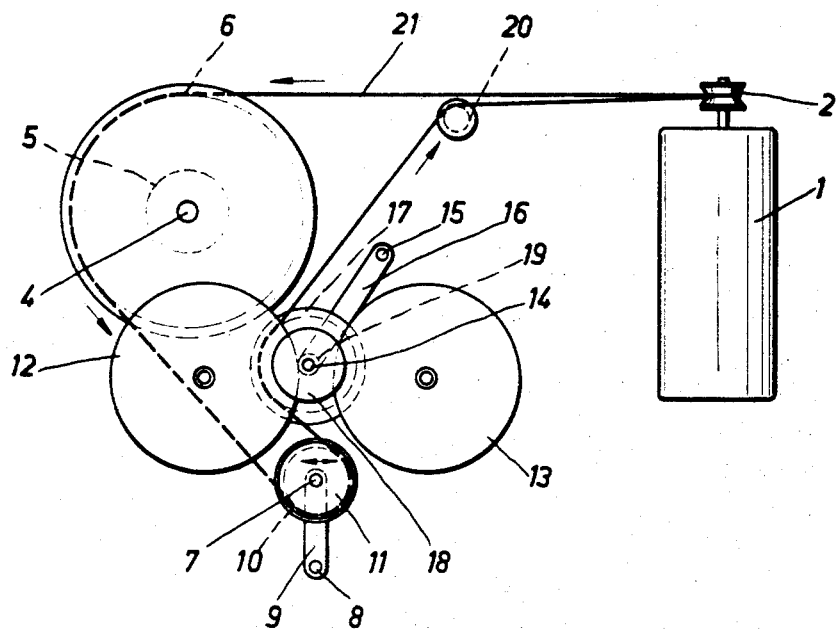

The present invention relates to a drive arrangement for a tape recorder in which an electric motor, which may for instance be supplied with current from a battery, drives a flywheel coaxially fixed to a tone shaft, a first friction wheel which includes a slip-clutch and which is movable in engagement with a take-up disk of the recorder, as well as a second fast rotating friction wheel which is selectively movable into contact with the take-up disk and a wind-off disk to respectively drive the same.

It is known to drive the take-up disk and wind-off disk of a tape recorder by means of friction wheels, whereby a slip clutch is preferably built into the take-up disk. An arrangement is also known in which the friction wheels are driven from the drive motor by means of a rubber belt, and in which a slip clutch is provided in the take-up disk, while the capstan shaft is driven from the motor by means of an additional rubber belt.

The incorporation of the slip clutch into the take-up disk has however the disadvantage that this slip clutch is actuated during all operating conditions of the tape recorder so that the friction linings of the clutch as for instance felt, rubber, or similar material, are subjected to considerable wear.

In order to avoid this disadvantage it has already been suggested to incorporate the slip clutch not in the take-up disk, but into the friction wheel which drives the take-up disk during normal operation, that is recording or reproduction. In such an arrangement the slip clutch is in actuation only during normal operation of the tape recorder, whereas during stopping or fast winding of the tape the slip clutch will not be actuated, since the friction wheel in which the slip clutch is incorporated will not be in contact with the take-up disk during such operation of the tape recorder. In this known arrangement the capstan shaft is driven by means of a rubber belt from the drive shaft of the motor, whereas the friction wheel for the take-up disk is driven during normal operation of the tape recorder by friction directly from a drive roller mounted on the motor shaft. This known friction drive, however, does not work satisfactorily in practice since due to the high number of revolutions of the electric drive motor the aforementioned friction drive is subjected to considerable wear and causes also rattling, and in addition the friction drive arrangement operates also with a rather low efficiency.

It is an object of the present invention to provide for a drive arrangement for a tape recorder which avoids the above-mentioned disadvantages of drive arrangements known in the art.

It is an additional object of the present invention to provide for a drive arrangement for a tape recorder which will operate with high efficiency and which will stand up perfectly during extended use.

It is a further object of the present invention to provide for a drive arrangement for a tape recorder which is composed of relatively few and simple parts and arranged in such a manner that the part of the drive arrangement which is subjected to the greatest wear can be exchanged quickly and expediently.

With these objects in view, the drive arrangement for a tape recorder mainly comprises according to the present invention capstan shaft means including a flywheel fixed thereto for rotation about a common axis, a take-up disk adapted to carry a take-up spool for the tape, a wind-off disk adapted to carry a tape supply spool, a first friction wheel, first mounting means mounting the first friction wheel movable between an active position in which the first friction wheel frictionally engages the periphery of the take-up disk for driving the same during normal operation of the tape recorder and an inactive position disengaged from the periphery, a second friction wheel, second mounting means mounting the second friction wheel movable between a pair of positions in which the second friction wheel respectively frictionally engages the periphery of the take-up disk and that of the wind-off disk for respectively driving the same, a drive motor having a drive shaft, a pulley fixedly mounted on the drive shaft, three additional pulleys respectively coaxially arranged with the wheels, a friction clutch between the first friction wheel and the pulley coaxially therewith, the other of the three additional pulleys being respectively fixed to the wheels coaxially arranged therewith, and a single slightly elastic, elongated flexible member, for instance a rubber cord, extending in a closed loop about said pulleys for driving said wheels during operation of the drive motor.

The arrangement may also include at least one guide roller engaging the elongated flexible member between two adjacent pulleys for guiding the elongated flexible member along its path.

In a preferred space saving arrangement the axes of the aforementioned wheels are arranged substantially parallel to each other, while the axis of the drive shaft is substantially normal to the axes of the wheels.

It is also advantageous to mount at least the shaft of one of the wheels at least on one end on a bearing resiliently pressed against the respective shaft end so that the shaft may be tilted releasing the one end from the bearing to remove the elongated flexible member from the pulleys without dismounting the bearing so that the elongated flexible member, which may be constituted for instance by a rubber belt or a rubber cord and which is subjected to wear during extended use, may be easily exchanged.

Figure 2:
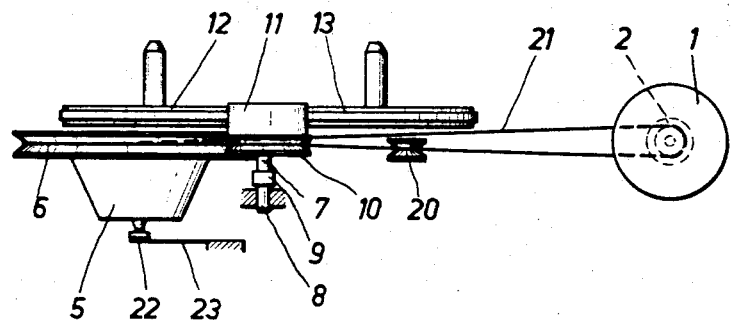

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic top view of the drive arrangement according to the present invention in which only the parts necessary for the understanding of the drive arrangement are illustrated; and FIG. 2 is a schematic side view of the drive arrangement shown in FIG. 1.

Referring now to the drawings, it will be seen that the drive arrangement for a tape-recorder according to the present invention includes an electric drive motor 1 on the drive shaft of which a pulley 2 is mounted. Arranged laterally of the drive motor 1 is a capstan shaft 4 to which a flywheel mass 5 and a pulley 6 are fixedly connected coaxially arranged therewith. The arrangement includes also a take-up disk 12 adapted to carry a take-up spool for the tape and a wind-off disk 13 adapted to carry a tape supply spool. A first friction wheel 19 is arranged between the take-up disk and the wind-off disk movable between an active position as shown in FIG. 1 in which the first friction wheel 19 frictionally engages the periphery of the take-up disk 12 for rotating the latter about its axis and an inactive position disengaged therefrom. The means mounting the friction wheel 19 movable between the positions thereof may include a lever 16 turnably mounted at one end thereof on a pin 15 and carrying on the other end thereof a pin 14 on which the friction disk 19 is turnably mounted. A pulley 17 is also turnably mounted on the pin 14 and a slip clutch 18, which may be of any known standard construction and is therefore only schematically indicated in FIG. 1, is arranged between the pulley 17 and the friction wheel 19 for driving the latter during rotation of the pulley while permitting the friction wheel to slip relative to the pulley 17.

The drive arrangement includes further a second friction wheel 11 and means mounting the second friction wheel movable between a pair of positions in which the second friction wheel respectively engages the periphery of the take-up disk 12 or the periphery of the wind-off disk 13 for respectively driving the disks for fast-forward or rearward movement of the tape. The means mounting the second friction wheel 11 may include a lever 9 turnably mounted at one end thereof on a pin 8 and carrying at the other end thereof a trunnion 7 on which the second friction wheel is turnably mounted. A pulley 10 is coaxially arranged with the second friction wheel and fixed thereto for simultaneous rotation therewith. A single, slightly elastic, elongated flexible member 21, which may for instance be constituted by a rubber cord, is wound in a closed loop about the pulleys 2, 6, 10, 17 and an additional guide pulley 20 which may be arranged between the pulleys 17 and 2, so that the capstan shaft 4 and the friction wheels 19 and 10 are driven by this single elongated flexible member from the electric motor.

As mentioned before, the first friction wheel 19 serves to drive the take-up disk 12 during normal operation of the tape recorder, that is during recording or reproducing, whereas the second friction wheel 11 drives either the take-up disk 12 or the wind-off disk 13 during fast-forward or rearward movement of the tape and therefore the diameter of the first friction wheel 19 is smaller than that of the second friction wheel, whereas the diameter of the pulley 17 coordinated with the first friction wheel 19 is preferably larger than the diameter of the pulley 10 coordinated with the second friction wheel 11.

In a preferred space-saving arrangement the axis of the drive shaft of the motor 1 is arranged substantially normal to the axes of the capstan shaft 4 and the two friction wheels and in this case the rubber cord 21 is twisted through 90° between the pulley 2 and the three additional pulleys. It is also advantageous to mount at least some of the shafts of the pulleys which are driven by the rubber cord 21 on bearings resiliently pressed against one end of the respective shaft so that the shaft may be tilted by releasing the one end from the bearing to remove the rubber cord 21 from the pulleys without dismounting the bearings. Such a bearing construction is schematically illustrated in FIG. 2 for the common shaft of the capstan shaft 4, the pulley 6 and the flywheel 5 in which the lower end of the shaft is mounted in thrust bearing 22 which is resiliently pressed against the lower end of the shaft by a leaf spring 23.

It will be understood that each of the elements described above, or two or more together, may also find a useful application in other types of drive arrangement for a tape recorder differing from the types described above.

While the invention has been illustrated and described as embodied in a drive arrangement for a tape recorder including a single elongated flexible member for driving the various components of the tape recorder, it is not intended to be limited to the details shown, since various modifications and structural changes may be made without departing in any way from the spirit of the present invention.

For instance the means mounting the first and the second friction wheel of the arrangement movable between the position thereof may include instead of tiltable levers as shown in FIG. 1 also shiftable members for moving the friction wheels between the positions thereof.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A drive arrangement for a tape recorder comprising, in combination, a capstan shaft; a flywheel coaxially fixed to the capstan shaft for rotation therewith; a take-up disk adapted to carry a take-up spool; a wind-off disk adapted to carry a tape supply spool; a first friction wheel; first mounting means mounting said first friction wheel movable between an active position frictionally engaging the periphery of said take-up disk for driving the same during normal operation of the tape recorder and an inactive position disengaged from said periphery; a second friction wheel; second mounting means mounting said second friction wheel movable between a pair of positions in which said second friction wheel respectively engages the periphery of said take-up disk or that of said wind-off disk for driving the respective disk for fast-forward or rearward movement of the tape; a drive motor having a drive shaft; a pulley fixedly mounted on said drive shaft; three additional pulleys, one each respectively coaxially arranged with one each of said wheels; a slip clutch between said first friction wheel and the pulley coaxially arranged therewith, the other of said three additional pulleys being respectively fixed to the wheels coaxially arranged therewith; and a single slightly elastic, elongated flexible member extending in a closed loop about said pulleys for driving said wheels during operation of said drive motor.

2. A drive arrangement as defined in claim 1, and including a guide roller engaging said elongated flexible member between two of said pulleys for additionally guiding said member.

3. A drive arrangement as defined in claim 1, wherein at least one of said mounting means includes a lever pivotally mounted in the region of one end and turnably mounting the respective friction wheel in the region of the other end thereof.

4. A drive arrangement as defined in claim 1, wherein the axes of said wheels are substantially parallel to each other and wherein the axis of said drive shaft is substantially normal to the axes of said wheels.

5. A drive arrangement as defined in claim 4 and including a guide roller engaging said elongated flexible member between the pulley on the drive shaft and the pulley on one of said wheels.

6. A drive arrangement as defined in claim 1, wherein said second friction wheel has a greater diameter than said first friction wheel and the pulley connected to said first friction wheel has a diameter greater than that of the pulley connected to said second friction wheel.

7. A drive arrangement as defined in claim 1, wherein the shaft of at least one of said wheels is mounted at least on one end thereof on a bearing resiliently pressed against said one shaft end so that said shaft may be tilted by releasing said one end from said bearing to remove said elongated flexible member from said pulleys without dismounting said bearing.

8. A drive arrangement as defined in claim 1, wherein said elongated flexible member is a rubber cord.

References Cited

UNITED STATES PATENTS 2,978,198   4/1961   Bierman _____ 242—55.12

FOREIGN PATENTS 560,459   4/1957   Italy.

GEORGE F. MAUTZ, *Primary Examiner.*